United States Patent [19]

Jacocks et al.

[11] 4,425,239

[45] Jan. 10, 1984

[54] METHOD AND APPARATUS FOR OIL-WATER SEPARATION

[75] Inventors: Claud L. Jacocks; Robbie J. LaFleur, both of Lake Charles, La.; Ralph L. Grimsley, Ponca City, Okla.

[73] Assignee: Conoco Inc., Ponca City, Okla.

[21] Appl. No.: 334,097

[22] Filed: Dec. 24, 1981

[51] Int. Cl.³ .............................................. B01D 21/26
[52] U.S. Cl. .................................... 210/787; 210/802; 210/96.1; 210/521; 210/DIG. 5
[58] Field of Search ....................... 55/45, 46, 176, 177, 55/184, 191, 203, 457; 210/96.1, 304, 416.1, 519, 521, 522, 787, 801, 802, DIG. 5

[56] References Cited

U.S. PATENT DOCUMENTS

| | | | |
|---|---|---|---|
| 719,541 | 2/1903 | Wheelwright | 210/416.1 X |
| 1,672,583 | 6/1928 | Travers | 210/801 |
| 1,970,783 | 8/1934 | Walker | 55/184 |
| 2,125,722 | 8/1938 | Hawkins | 210/96.1 X |
| 3,067,878 | 12/1962 | Genter et al. | 210/521 X |
| 3,555,820 | 1/1971 | Cramer et al. | 55/177 |
| 4,048,069 | 9/1977 | Cuvillier et al. | 210/801 |
| 4,308,136 | 12/1981 | Warne, Jr. | 210/519 X |
| 4,345,920 | 8/1982 | Ross | 55/46 |

FOREIGN PATENT DOCUMENTS

| | | | |
|---|---|---|---|
| 23388 | 2/1981 | European Pat. Off. | 210/519 |
| 274816 | 11/1926 | Fed. Rep. of Germany | 210/519 |
| 555806 | 7/1932 | Fed. Rep. of Germany | 210/521 |
| 2925492 | 1/1981 | Fed. Rep. of Germany | 210/519 |
| 141849 | 1/1960 | U.S.S.R. | 210/521 |

*Primary Examiner*—Robert H. Spitzer
*Attorney, Agent, or Firm*—A. Joe Reinert

[57] ABSTRACT

A system for separating a multi-component fluid such as a water-in-oil emulsion into at least two components. The system comprises a cylindrical vessel which is equipped with a baffle system interposed between fluid inlet and outlet means. The baffle system defines a horizontally extending spiral flow path which is in fluid communication with the fluid inlet at one end and with the outlet means at the other end. The flow path is characterized by a vertically elongated channel cross section. Within the flow path, one or more distributor means are provided which function to distribute the flow of fluid in the spiral flow path evenly throughout a substantial vertical interval of the channel cross section. The distributor means may be located adjacent the inlet and outlets of the vessel and may take the form of vertically elongated impellers mounted for rotation about vertical axes.

11 Claims, 3 Drawing Figures

METHOD AND APPARATUS FOR OIL-WATER SEPARATION

DESCRIPTION

1. Technical Field

This invention relates to the separation of fluids into a plurality of components and more particularly to the separation of an oil-water mixture into oil and water components by means of a separator having a high residence time.

2. Art Background

There are various industrial applications in which it is desirable to separate the oil and water phases of a fluid stream into discrete components. In the petroleum industry, crude oil recovered from wells penetrating subterranean oil-bearing formations is usually accompanied by water. Since the crude oil when it is sold to a pipeline or other transportation facility should be substantially free of water, e.g. have a water content of less than 1 or 2% by volume, it becomes necessary to provide for dehydration of the oil at the field processing facility associated with the production wells.

The complexity of oil-water separation facilities depends upon the form of the water found in association with the crude oil. Where the water present in the production stream is substantially "free water", the oil and water are readily separated because of their different densities. In this case satisfactory separation usually can be accomplished simply by passing the production stream into a vessel in which gravity segregation occurs. However, in many cases the oil and water are mixed together in an emulsified condition which is highly stable. Typically, the emulsion is of a water-in-oil type in which water droplets are dispersed throughout the oil. The water droplets in an oil-field emulsion may vary widely in size, from very minute particles of only a few microns or less up to relatively large particles of several millimeters in diameter. Particularly in the case of water-in-oil emulsions in which the water phase is dispersed in very small droplet form, such emulsions can often times be broken only with difficulty.

The techniques predominantly employed in dehydrating oil-field emulsions include gravity settling, heat treating, electrical, and chemical treating techniques. Other procedures less widely used include centrifugal and filtration techniques. In each of the widely used techniques, it is desirable to provide for as high as residence time of the emulsion within the separation vessel as can reasonably be achieved.

One technique for increasing the resident time within an oil-water separation vessel is through the use of weirs and baffles which direct the fluid involved in a tortuous path through the separation vessel. Thus Kennedy, J. L.; Iran Has Big Desalting and Pressure-Maintenance Job Ahead" Oil and Gas Journal", Mar. 13, 1978, pages 65-70; discloses a twostage coalescing system in which each stage is provided with a baffle system. The first stage takes the form of a tank coalescer 30 meters in diameter and 17 meters high and which is equipped with a triangular baffle section in the middle of the tank. One of the baffle sections is open 1.8 meters above the bottom of the tank and the inlet stream of crude oil and water is forced down the triangular section and under the shorter baffle section. The oil-water mixture travels through the water zone to help coalesce water droplets and the crude oil and water are then gradually separated as they flow through a spiral baffle system to an overflow weir through which the dehydrated crude oil leaves the tank. The second-stage tank coalescer is 33 meters in diameter and 14 meters high and includes a baffle system provided by two inner tanks. In this case the incoming fluid flows through the annular space between the outer two concentric tanks and over a baffle which is open about 1.5 meters above the oil-water interface. The fluid then flows through the annular space between the inner and the intermediate tank and ultimately into the interior of the inner tank.

DISCLOSURE OF THE INVENTION

In accordance with the present invention there is provided a new and improved process for the separation of a fluid comprising an oil and water mixture into discrete oil and water components. In carrying out the invention, the oil-water fluid is passed into a separation zone where it is conformed in a horizontally extending spiral flow path. The channel of the spiral flow path has a vertically elongated cross section. The flow of fluid in the separation zone is continued in a manner to distribute the flow of fluid within the flow path evenly throughout a substantial vertical interval of the channel cross section. Thus, the fluid moves through the separation zone in a manner to provide a relatively long residence time without channeling and bypassing of the fluid to the outlet from the separation zone. Preferably the fluid is withdrawn from the spiral flow path evenly throughout a substantial vertical interval of the channel cross section.

In a further aspect of the invention, there is provided a separation system comprising a cylindrical vessel. Baffle means within the vessel define a horizontally extending flow path which is characterized by a vertically elongated channel cross section. Inlet distributor means are provided for distributing the flow of fluid in the flow path evenly throughout a substantial vertical interval of the channel cross section. Outlet distributor means are also provided to withdraw fluids from the spiral flow path evenly throughout a substantial vertical interval of the channel cross section. Preferably, the inlet and outlet distributor means take the form of vertically elongated impellers which are mounted for rotation about vertical axes.

BEST MODES FOR CARRYING OUT THE INVENTION

In the field processing associated with the production of crude oil, various procedures may be employed to effect the separation of gas from the produced liquid phase and the purification of the oil fraction by dehydration of the liquid phase. Typically the production stream is passed from the well head to a suitable gas-oil separator where gas is separated from the liquid phase in one or more stages. The liquid production stream, which may still contain significant quantities of gas, is then passed to a dehydration unit. The operation of the dehydration unit, commonly termed an oil-water separator, may proceed in accordance with any one or more of the emulsion breaking techniques noted previously. Where the oil contains relatively large quantities of water which is not fixed in an emulsion, i.e. free water, the production stream may be passed through a free water knockout prior to, or in lieu of, the use of an emulsion breaking dehydrator.

The present invention may be employed in conjunction with any of these oil-water separation procedures. However, it is particularly useful in the breaking of oil and water emulsions, which as noted previously normally are of the water-in-oil type, and the invention will be described in detail in such an application.

Figure 1:
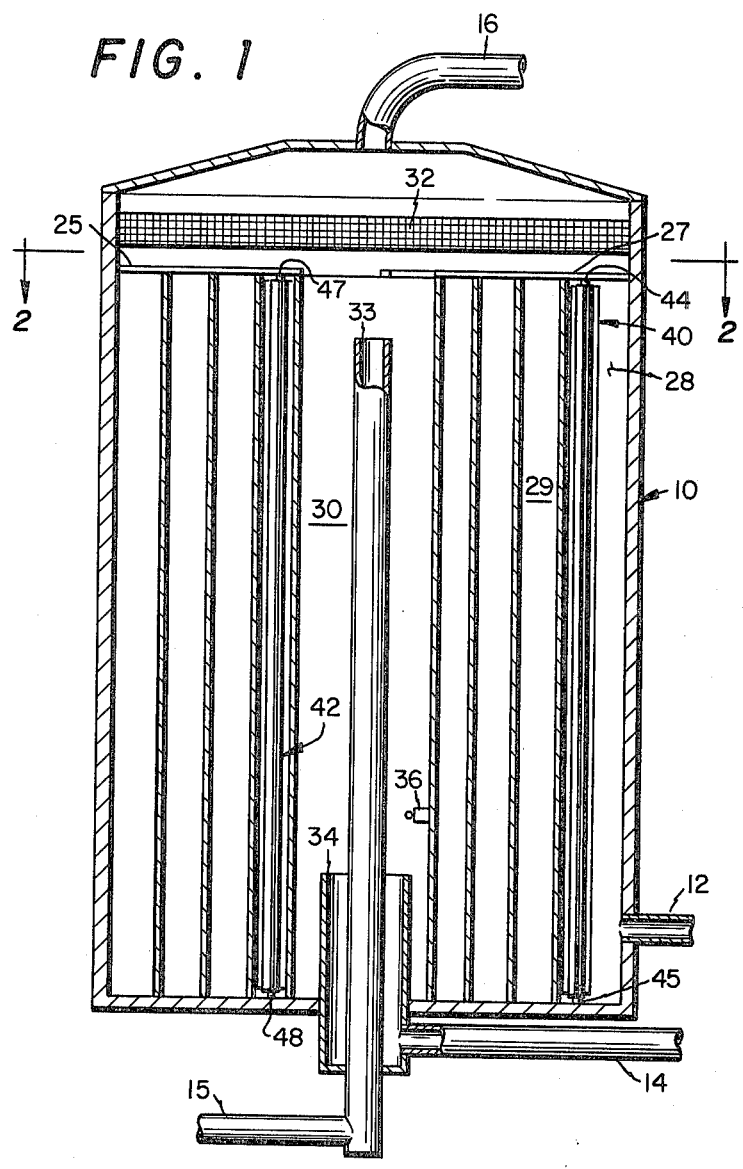
FIG. 1 is a side elevation, partly in section, showing the interior of an oil-water separator constructed in accordance with the present invention.

Turning now to the drawings, FIG. 1 illustrates a side elevational view of an oil-water separator embodying the present invention. Parts of the structure of FIG. 1 are broken away and others are shown in cross section in order to illustrate the interior of the separation vessel. More particularly and with reference to FIG. 1 the separator comprises a tank 10 which is provided with an inlet line 12 and outlet lines 14, 15, and 16. As shown partially in FIG. 1 and in greater detail in FIG. 2, the separation vessel is equipped with an interior baffle system 18 which forms a plurality of horizontally extending spiral flights indicated by reference numerals 20, 21, 22 and 23. The spiral baffle system is secured to the tank at the bottom and is held in place at the top by means of spider arms 25, 26 and 27. Two of those arms also function to support inlet and outlet impellers as described in greater detail hereinafter.

Figure 2:
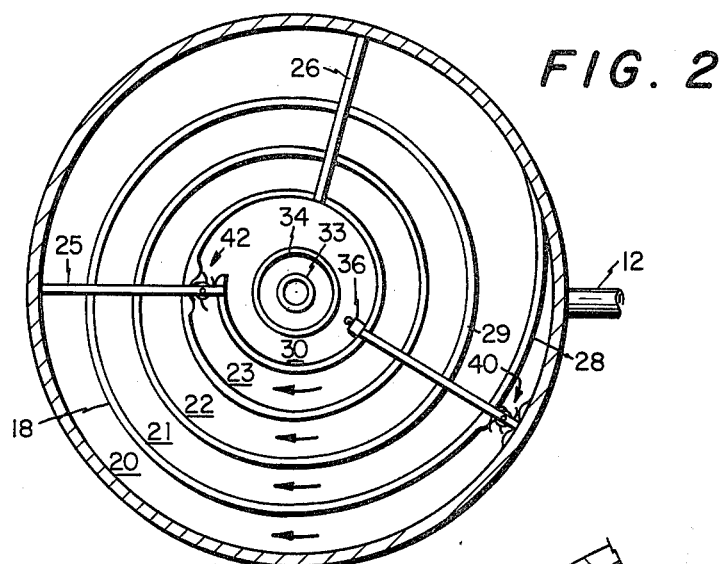
FIG. 2 is a horizontal cross sectional view taken along lines 2—2 of FIG. 1.

In operation of the separator shown in FIGS. 1 and 2, a production stream, e.g. a water-in-oil emulsion, is passed into the separator and introduced into the first flight 20 defined by the wall of the tank 10 and the wall portion 28 of the spiral baffle. The fluid flows through the spiral flow path in the direction as indicated by the arrows shown in FIG. 2 until it reaches a central sump zone indicated by reference character 30. As the fluid moves through the separator along the spiral flow path it is separated into oil and water components as described in greater detail hereinafter and, in addition, gas dissolved in the oil evolves and passes through a mist extractor 32 and is taken overhead through line 16. The mist extractor 32 may be of any suitable type. For example it may take the form of a wire mesh structure, steel-wool, or another suitable structure which functions to extract liquid particles from the evolving gas. Such mist extractors are well known to those skilled in the art and accordingly will not be discussed further.

The separate fluid components which accumulate in the sump zone 30 are withdrawn therefrom by means of stand pipes 33 and 34 as dictated by the respective densities of the oil and water components. Under normal circumstances the oil component will exhibit a significantly lower density than the water component and will float on the underlying water layer. The oil component thus passes into the open upper end of stand pipe 34 and flows downwardly to outlet line 15. The heavier water flows into the annulus defined by stand pipe 34 and stand pipe 33 and is withdrawn from the separator via line 14. The sump zone 30 is also provided with an interface detector 36 at a level somewhat above the top of stand pipe 34. The interface detector may be of any suitable type, such as a float designed to follow the oil-water interface or a capacitance probe, and functions to control a valve (not shown) in line 14. Thus, for example, if the oil-water interface falls below the level of detector 36, it will generate an appropriate control signal which functions to close the valve in line 14.

From an examination of FIGS. 1 and 2, it can be seen that the spiral baffle system defines a flow channel having a cross section which is vertically elongated. The width of each spiral flight, i.e., between adjacent wall portions such as indicated by reference numerals 28 and 29, normally will fall within the range of about one-half to 2 feet depending upon the size of the separation vessel. The vertical dimension, as indicated by the distance from the bottom of the tank to the top of the baffle, normally will be at least 8 to 10 feet and may be substantially greater. In most cases, the ratio of the vertical dimension to the horizontal dimension of the channel cross section will fall within the range of 4 to 20.

The efficiency of oil-water separators is commonly given in terms of the actual residence time of the fluid as it flows through the separator expressed as a percentage of the theoretical residence time for the separator at the flow rate involved. For example, an oil-water separator having a volumetric capacity of 100 barrels would have a theoretical resident time of four hours at a flow rate through the separator of 25 barrels per hour. If in fact the residence time of fluid within the separator averages only two hours the separator is said to have an efficiency of 50%. In the present invention, separator efficiency is enhanced by providing for, in conjunction with the spiral flow of fluid through the separator vessel, an even distribution of fluid through substantially all or at least most of the vertical column of fluid within the separator. More particularly the separator vessel is provided with distributor means which functions to distribute the flow of fluid in the spiral flow path evenly throughout a substantial vertical interval of the channel cross section of the flow path. Preferably the distributor means is located near the inlet of the separator and the separator is also provided with outlet distributor means which functions to withdraw fluid from the spiral flow path evenly throughout a substantial vertical interval of the channel cross section. In one aspect of the invention, the distributor means employed in conjunction with the spiral flow path may be any suitable arrangement which functions to provide a substantially constant flow profile throughout the involved vertical interval of the flow channel. Stated otherwise, the velocity profile throughout this vertical interval is substantially constant. As noted above, this relationship preferably is provided near the vessel entrance and also at the termination of the spiral flow path.

In the preferred embodiment of the invention, even distribution of fluid flow is provided at the inlet and outlet portions of the spiral flow path by means of vertically elongated impellers mounted for rotation about vertical axes. Thus, as illustrated in FIGS. 1 and 2, the separation vessel 10 is provided with an inlet impeller 40 and an outlet impeller 42. Inlet impeller 40 is provided with upper and lower axle pins 44 and 45 which are journaled in arm 27 and the bottom of tank 10 respectfully. Outlet impeller 42 is similarly supported between spider arm 25 and the bottom plate of tank 10 by upper and lower axle pins 47 and 48, respectively.

As shown in FIG. 2, each of the impellers 40 and 42 is equipped with four impeller blades secured to a central mandrel which, during operation, rotates in a clockwise direction as viewed in FIG. 2. As shown in FIG. 1, the impeller blades extend throughout the vertical dimension of the channel cross section provided by the spiral baffle system.

Figure 3:
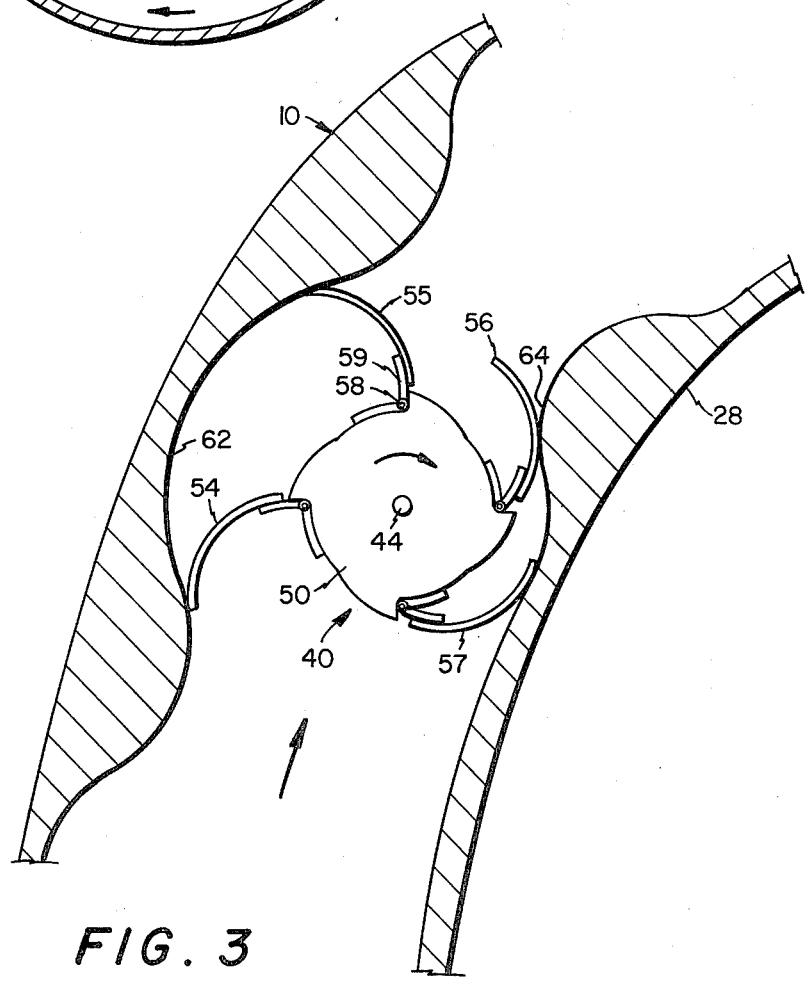
FIG. 3 is an enlarged plan view of an impeller employed for flow distribution in the present invention.

The impeller structure is shown in more detail in FIG. 3 which is an enlarged plan view of the inlet impeller 40. As illustrated in FIG. 3, impeller 40 comprises a central mandrel 50 which rotates around the vertical axis defined by pin 44 and which supports hinged impeller blades 54, 55, 56 and 57. Each of the impeller vanes is pivotably mounted on the mandrel 50 by means of a suitable hinge mechanism so that the vane can move from a closed position, indicated by vane 56 to an open position such as indicated by the remaining vanes. Each of the impeller vanes is biased to the opened position by any suitable means. For example, as shown with respect to vane 57, a coil spring 58 is mounted on the hinge pivot for the impeller vane and terminates in a projecting arm 59 which biases the impeller vane to the open position shown. As the impeller rotates in a clockwise direction, the impeller vanes successively contact the conforming portion 62 of tank 10 depressing the vanes slightly. On continued rotation, the vane returns to the open position and then comes into contact with the conforming portion 64 of baffle wall 28 thus depressing the vane to the closed position. Thereafter, upon continuing, as each vane reaches the upstream side of the impeller axis it is biased to the open position. It will be recognized that while only impeller vane 57 is shown as equipped with a biasing spring 58, the other impeller vanes will be similarly equipped. Also, the construction of the outlet impeller 42, while not shown in detail, normally will be the same as the inlet impeller. Other suitable impeller configurations may also be employed. For example, the impeller vanes may be made of a flexible material, thus eliminating the need for the hinge mechanism shown.

The impeller or impellers located in the spiral flow path can be driven by a prime mover or they can be driven by fluid flow through the separator in response to a pressure differential between the inlet and outlets of the separator. In the latter case the resistance to movement offered by the frictional engagement between the outer ends of the impeller vanes and the conforming wall surfaces will offer some resistance to fluid flow through the separator vessel.

In operation of the system, the oil-water mixture enters the vessel through inlet 12 and flows from the anterior portion of the flow passage past impeller 40. After an initial start-up period during which the vessel capacity is filled, flow through the separator is controlled by the impellers and is in a substantially horizontal direction in the interval of the spiral passageway between the impellers. While it is preferred to employ a plurality of impellers and to locate them near the inlet and outlet ends of the spiral passageway, it will be recognized that significant benefits can be derived by using only one flow distributor. Where only a single distributor is used it will be preferred to locate it near the inlet of the separator. It will also be understood that one or more additional flow distributors may be employed at intermediate locations between the locations occupied by impellers 40 and 42.

As noted previously, the present invention is particularly well suited for use in breaking tight water-in-oil emulsions. Thus the invention may be employed in conjunction with other techniques such as heat treating, chemical dehydration, electrical, or the use of coalescing membranes. Where heat treating is used, the fluid can be heated prior to introduction to the separation vessel or the separation vessel may include a heat exchanger. Typically, the fluid mixture will be heated to a temperature within the range of 125°–200° F. At this elevated temperature, the viscosity of the oil will normally be reduced substantially so that gravity segregation may occur more readily. In addition the surface chemistry characteristics of the oil-water interfaces may be changed to facilitate coalescing of the dispersed phase (normally water) and the attendant gravity segregation.

Where chemical dehydration techniques are employed, chemicals may be added to the fluid prior to or during its flow through the separation vessel. Suitable chemical dehydration agents are well known to those skilled in the art and include various anionic and nonionic surfactants which function to alter the oil-water interfacial tension in a manner to promote de-emulsification.

Because of the relatively close proximity to one another of the adjacent vertical walls defining the spiral flow path, the present invention is particularly well suited for applications in which a coalescing material is used to accelerate the agglomeration of the dispersed phase of the emulsion into a continuous phase. In this case, all or part of the wall structures defining the spiral flow path may be coated with a coalescing membrane. Typically, the coalescing membrane will take the form of a porous material which is preferentially wetted by the dispersed water phase in the presence of the oil phase. For example, the membrane material may take the form of cellulose, polyethers such as polyethylene oxide and polyethylene oxide-polypropylene oxide copolymers, and various polyesters. Typically the top one-half to two-thirds of the interior wall of tank 10 and the wall portions of the baffle structure may be coated with such coalescing materials.

Having described specific embodiments of the present invention, it will be understood that modifications thereof may be suggested to those skilled in the art, and it is intended to cover all such modifications as fall within the scope of the appended claims.

What is claimed is:

1. In a method for separating a fluid comprising an oil-water mixture into separate oil and water components, the steps comprising:
   (a) passing said fluid into a separation zone and within said zone conforming said fluid in a horizontally extending continuous spiral flow path having a vertically elongated channel cross section,
   (b) continuing to flow said fluid into said separation zone and along said spiral flow path wherby said fluid separates into oil and water components,
   (c) withdrawing said oil and water components from said separation zone, and
   (d) distributing the flow of fluid within said spiral flow path evenly throughout a substantial vertical interval of the channel cross section of said flow path.

2. The method of claim 1 wherein step (d) is carried out in said spiral flow path adjacent the point of introduction of said fluid into said separation zone.

3. The method of claim 1 wherein step (d) is carried out at a plurality of spaced apart locations along said spiral flow path.

4. In a system for separating an oil-water mixture into at least two components, having a combination comprising:
   (a) a vertically oriented cylindrical separation vessel:
   (b) inlet means adapted for the passage of fluid to said vessel and outlet means adapted for the separate withdrawal of fluid components from said vessel comprising a lower fluid outlet for the withdrawal of a relatively high density component and an upper fluid outlet for the withdrawal of a relatively low density component; and (c) baffle means within said vessel defining a horizontally extending spiral flow path for flow of both components of the oil-water mixture in fluid communication at one end with said inlet means and in fluid communication at the other end with said outlet means;

the improvement comprising:

(d) said spiral flow path having a continuous vertically elongated cross section extending from said inlet means to said outlet means; and (e) distributor means for distributing the horizontal flow of fluid in said spiral flow path evenly over said vertically elongated cross section.

5. The combination of claim 4 wherein said distributor means comprises a vertically elongated impeller mounted in said spiral flow path for rotation about a vertical axis and for movement of said components horizontally past the vertical axis.

6. The system of claim 4 wherein said distributor means comprises a plurality of vertically elongated impellers located in said spiral flow path at spaced locations, each of said impellers being mounted in said spiral flow path for rotation about a vertical axis such that said components move horizontally past the vertical axis.

7. The system of claim 4 wherein said distributor means comprises means adjacent to said inlet for distributing the flow of fluid from said inlet to said spiral flow path evenly throughout a substantial vertical interval of said channel cross-section.

8. The system of claim 7 further comprising second distributor means adjacent said outlet means for withdrawing fluid from said spiral flow path to said outlet means evenly throughout a substantial vertical interval of said channel cross section.

9. The system of claim 8 wherein said first recited and said second distributor means each comprises a vertically elongated impeller mounted in said spiral flow path for rotation about a vertical axis such that said components move horizontally past the vertical axis.

10. The system of claim 4 wherein the distance between adjacent portions of said baffle means defining said spiral flow path is within the range of about ½–2 feet.

11. The system of claim 10 wherein the ratio of the vertical dimension to the horizontal dimension of said channel cross section is within the range of 4–20.

* * * * *